(No Model.) 3 Sheets—Sheet 2.
C. M. HOLDEN & E. M. GORDEN.
COMPUTING SCALE.
No. 542,523. Patented July 9, 1895.
Fig. 3.
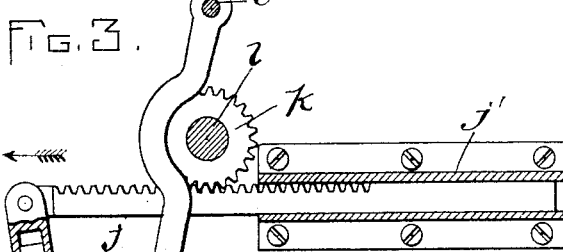
Fig. 5.
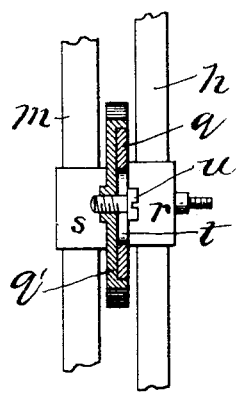
Fig. 4.
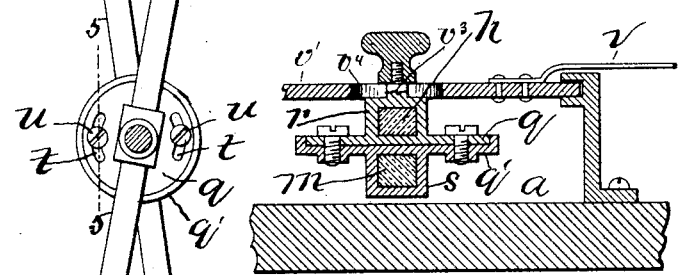
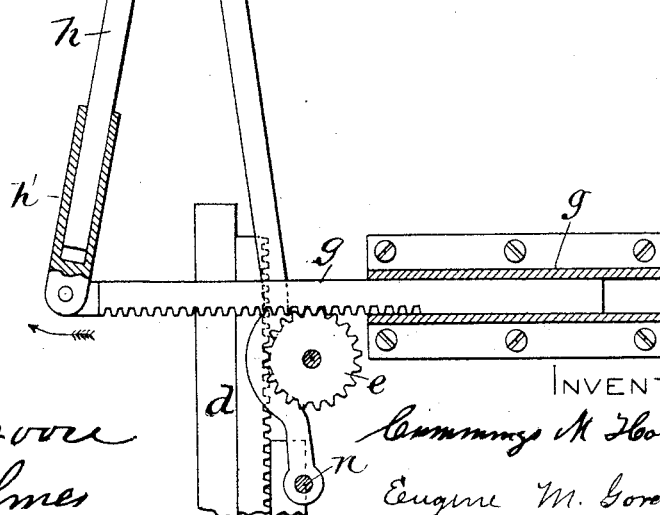
WITNESSES:
W C Moore
W J Holmes
INVENTORS
Cummings M Holden
Eugene M Gorden (No Model.) 3 Sheets—Sheet 3.
C. M. HOLDEN & E. M. GORDEN.
COMPUTING SCALE.
No. 542,523. Patented July 9, 1895.
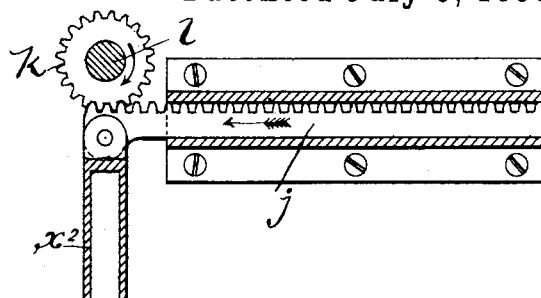
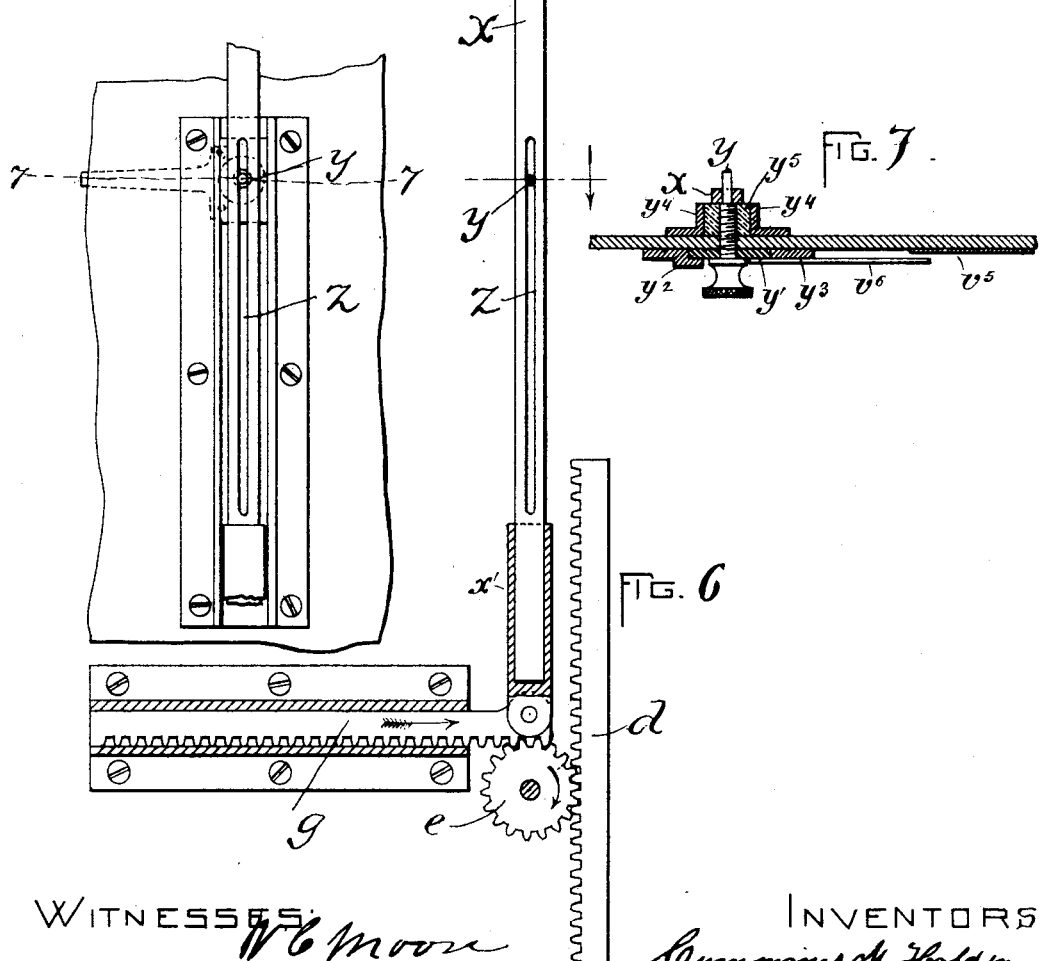
WITNESSES
W C Moore
W J Holmes
INVENTORS
Cummings M. Holden
Eugene M. Gorden

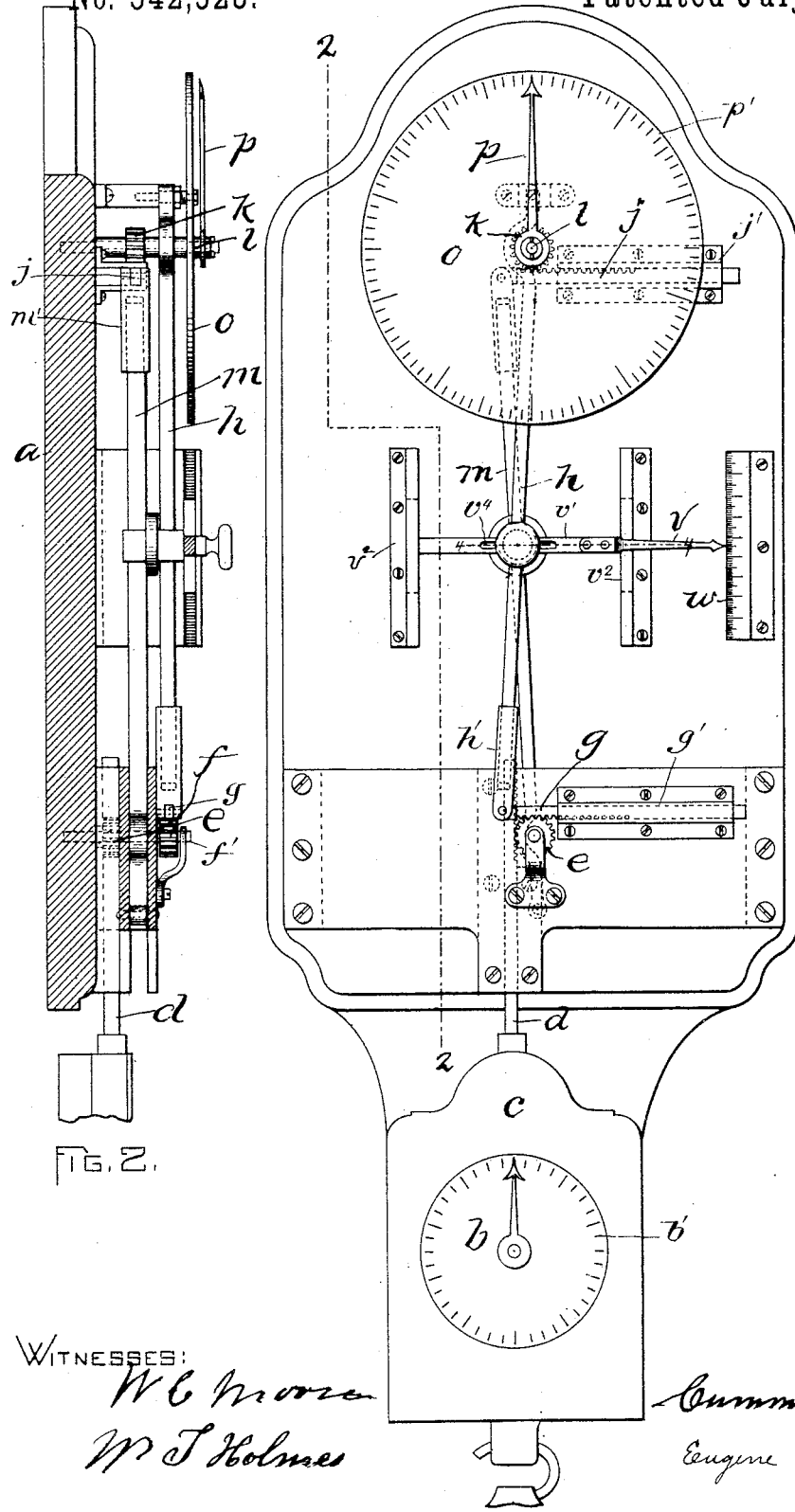

UNITED STATES PATENT OFFICE.

CUMMINGS M. HOLDEN, OF SOUTH WEST HARBOR, MAINE, AND EUGENE M. GORDEN, OF MALDEN, MASSACHUSETTS.

COMPUTING-SCALE.

SPECIFICATION forming part of Letters Patent No. 542,523, dated July 9, 1895.

Application filed July 2, 1894. Serial No. 516,296. (No model.)

*To all whom it may concern:*

Be it known that we, CUMMINGS M. HOLDEN, of South West Harbor, in the county of Hancock and State of Maine, and EUGENE M. GORDEN, of Malden, in the county of Middlesex and State of Massachusetts, have invented certain new and useful Improvements in Computing-Scales, of which the following is a specification.

This invention has relation to scales and balances equipped with means for indicating the price or cost of an article or thing at the same time with indicating its weight.

It is the object of the invention to provide mechanism in connection with a weighing-scale for indicating the price of the article weighed, which shall be at once simple in construction and certain in operation.

To these ends the invention consists in the improvements which we will now proceed to describe and claim, reference being had to the annexed drawings, and the letters marked thereon, forming a part of this specification, the same letters designating the same parts or features, as the case may be, wherever they occur.

Of the drawings, Figure 1 represents a front elevation of a computing-scale embodying our invention. Fig. 2 represents a section on line 2 2 of Fig. 1. Fig. 3 represents an elevation of a portion of the mechanism shown in Fig. 1 on a somewhat larger scale, the parts being shown in section. Fig. 4 represents a section on line 4 4 of Fig. 1. Fig. 5 represents a section on line 5 5 of Fig. 3. Fig. 6 represents a front elevation showing a somewhat-different mechanism for connecting the weighing mechanism with the cost-indicator, parts being removed and other parts being shown in section. Fig. 7 represents a section on line 7 7 of Fig. 8. Fig. 8 represents a rear elevation of a part of the mechanism.

The same letters of reference indicate the same parts in all the figures.

In the drawings, $a$ represents a suitable casing supporting a weighing mechanism, which may be of any suitable construction. For example, said mechanism may be any well-known spring-balance adapted to be actuated by the weight of the article being weighed, and comprising a rotary shaft having a pointer $b$ co-operating with a circular graduated plate $b'$. The weighing mechanism also includes a vertically-movable rack-bar $d$, which is depressed by the operation of the weighing mechanism, the extent of its depression being in proportion to the weight of the article which actuates the weighing mechanism. The casing is also provided with a cost-indicator, which, as here shown, comprises a rotary shaft $l$, to which rotary motion is imparted by means hereinafter described, a pointer $p$ affixed to said shaft, and a graduated circular plate $p'$, which co-operates with said pointer.

Suitable mechanism is provided for imparting motion to the shaft $l$ and pointer $p$ from the bar $d$. Said mechanism, as shown in Figs. 1 to 5, inclusive, includes, first, a lever $h$, which is pivotally connected at its upper end by a stud $i$ with a fixed support, and is adapted to oscillate on said stud, and is connected at its lower end with the bar $d$ in such manner that the depression of the said bar $d$ will impart a swinging movement to said lever; secondly a lever $m$, which is pivotally connected at its lower end by a stud $n$ with a fixed support, and is adapted to oscillate on said support, and is connected at a point between its ends by an adjustable fulcrum, hereinafter described, with the lever $h$ and connected at its upper end by suitable intermediate mechanism hereinafter described with the shaft $l$, the arrangement being such that motion imparted to the lever $h$ by the depression of the bar $d$ will be communicated to the lever $m$ through the adjustable fulcrum, and through the lever $m$ will partially rotate the shaft $l$, thus moving the pointer $p$ over the graduated plate $p'$. The connections here shown between the lever $h$ and the bar $d$ are a rack-bar $g$, pivotally connected to a sliding terminal $h'$ on the lower end of the lever $h$ and sliding in a fixed guide $g'$, and a pinion $f$, meshing with the rack-teeth on the rack and affixed to a shaft $f'$, journaled in fixed bearings, and a pinion $e$ on said shaft meshing with the rack-bar $g$. The connections between the lever $m$ and the pointer-shaft $l$ comprise a rack-bar $j$, pivotally connected to a sliding terminal $m'$ on the upper end of the lever $m$ and movable in a fixed guide $j'$, and a pinion $k$, affixed to the shaft $l$ and meshing with said rack-bar.

The levers $h\ m$ are connected by a vertically-adjustable fulcrum, which in this case is composed of two disks $q\ q'$, connected so that each may have a partially rotary movement on the other by means of studs $u\ u$, affixed to the disk $q'$, and segmental slots $t\ t$ in the disk $q$, through which said studs pass. The disk $q$ has a sleeve $r$, through which the lever $h$ passes, and the disk $q'$ has a similar sleeve $s$, through which the lever $m$ passes, said sleeves being adapted to slide in the direction of the length of the levers, and fitting the latter so closely that they remain by friction at any point to which they may be adjusted on the levers. It will be seen that when the levers $h\ m$ are adjusted so that they stand parallel with each other the described adjustable fulcrum may be raised or lowered to vary the length of the arms of said levers, or, in other words, to increase or decrease the distance between the fulcrum and the upper ends of the levers. It will also be seen that the depression of the bar $d$ by the weight of the article placed upon the pan or other support with which the weighing mechanism is provided will act, through the pinion $f$, shaft $f'$, pinion $e$, and rack $g$, to move the lever $h$ in the direction indicated by the arrow in Fig. 3. This motion of the lever $h$ will, through the adjustable fulcrum, move the upper end of the lever $m$ in the same direction, thus causing the lever $m$, through the rack $j$ and pinion $k$, to partially rotate the shaft $l$, thus operating the cost-indicator. It will further be seen that the extent of movement imparted to the pointer of the cost-indicator by the above-described operation will depend upon the position of the adjustable fulcrum, said movement being decreased by a partial adjustment of said fulcrum, and vice versa.

In connection with the adjustable fulcrum we employ a price-per-pound indicator to guide the operator in adjusting the fulcrum so that the cost-indicator will give the total cost of an article of any given price per pound. Said price-per-pound indicator, as here shown, comprises a finger or pointer $v$ attached to a cross bar or slide $v'$, the ends of which are fitted to move in fixed vertical guides $v^2\ v^2$ affixed on the casing $a$, and a fixed graduated scale-plate $w$ placed on the casing in position to co-operate with the pointer $v$. The adjustable fulcrum has a sliding connection with the bar $v'$ by means of a stud $v^3$ projecting from the socket $r$, as shown in Fig. 4, into a horizontal slot $v^4$ in the bar $v'$, said slot permitting the lateral movement of the fulcrum, which is caused by the swinging movement of the lever $h$. The bar $v'$ therefore constitutes a connection between the pointer $v$ and the adjustable fulcrum, causing the fulcrum and the pointer to stand in the same vertical position.

In Figs. 6, 7, and 8 we show a simpler arrangement of mechanism for communicating motion from the bar $d$ to the cost-indicator. In this case only one lever $x$ is employed, said lever oscillating on an adjustable fulcrum $y$. The fulcrum $y$ is a stud or pin suitably affixed to a slide $y'$, which is movable between fixed vertical guides $y^2\ y^3$, affixed on the casing $a$. The lever $x$ is provided with a longitudinal slot $z$, through which the fulcrum $y$ passes. Guides $y^4\ y^4$ are attached to the casing $a$, and receive between them a nut $y^5$, through which a threaded enlargement of the fulcrum-pin $y$ passes. The casing $a$ has a vertical slot through which the fulcrum-pin passes and in which it is capable of being vertically adjusted. The slide and fulcrum-pin may be secured at any position to which they may be adjusted by rotating the pin in the direction required to move the nut $y^5$ toward the slide, the nut being prevented from rotating by the guides $y^4$. The price-per-pound indicator in this case comprises a pointer $v^6$ affixed to the slide $y'$, and a graduated scale-plate $v^5$ affixed to the casing $a$ in position to co-operate with the pointer in indicating the position of the fulcrum for any given price per pound. The rack-bar $g$ in this case meshes directly with the pinion $e$, which engages the bar $d$, and the rack-bar $j$ is connected directly with the lever $x$, the latter having a sliding terminal $x'$ pivoted to the rack $g$, and a similar terminal $x^2$ pivoted to the rack $j$.

When the weighing mechanism is actuated by the weight of the article placed upon it to be weighed, the depression of the bar $d$ will cause a horizontal movement of the rack $g$ in the direction indicated by the arrow marked on said rack in Fig. 6. This will cause a movement of the rack $j$ in the opposite direction, said rack imparting to the pinion $k$ and shaft $l$ a rotary movement, which causes the pointer $p$ to move over the plate $p'$. As in the construction first described, the extent of movement of the pointer $d$ is governed by the position of the adjustable fulcrum, an upward movement of said fulcrum shortening the length of the upper arm of the lever and thus decreasing the extent of movement of the pointer $d$, and vice versa. The arrangement in each construction is such that any adjustment of the fulcrum, which is indicated by the price-per-pound indicator, produces a corresponding change in the movement of the pointer of the cost-indicator. It will, therefore, be seen that in operating the apparatus the operator has only to adjust the price-per-pound indicator to the price of the commodity being weighed in order to cause the cost-indicator to give the total cost of the article or quantity which is deposited on the weighing mechanism.

The described apparatus is extremely simple, and is adapted to be readily adjusted to meet the requirements of the different articles or commodities with which the apparatus has to do.

We believe ourselves to be the first to construct a computing-scale which comprises a weighing mechanism, a cost-indicator, intermediate mechanism which is actuated by the weighing mechanism and communicates motion therefrom to the cost-indicator, said mechanism including an oscillatory lever and a movable fulcrum, the position of which determines the extent of operation of the cost-indicator, and a price-per-pound indicator, whereby the position of the fulcrum for any given price per pound may be indicated. We therefore consider that any variation in the connections above described between said lever and the weighing mechanism and cost-indicator, and any variations in the construction of the price-per-pound indicator, will come within the scope of our invention.

We claim—

1. A computing-scale comprising in its construction a weighing mechanism, a cost-indicator, intermediate mechanism which is actuated by the weighing mechanism and communicates motion therefrom to the cost-indicator, said intermediate mechanism including an oscillatory lever and a movable fulcrum the position of which determines the extent of operation of the cost indicator, and a price-per-pound indicator whereby the position of the fulcrum for any given price per pound may be indicated, as set forth.

2. A computing-scale comprising in its construction a weighing mechanism, a cost-indicator, a movable fulcrum, a lever adapted to oscillate on said fulcrum, connections between one end of said lever and the weighing mechanism through which a movement is imparted to the lever when said mechanism is actuated, connections between the other end of the lever and the cost-indicator whereby the said movement of the lever is caused to actuate the cost-indicator, and a price-per-pound indicator adapted to indicate the position of the fulcrum required for the indication of any desired price per pound, the position of said fulcrum governing the operation of the cost-indicator by the lever, as set forth.

3. A computing-scale comprising in its construction a weighing mechanism, a cost-indicator, a slide movable in fixed guides and provided with a fulcrum-pin or stud, a lever having a slot receiving said fulcrum-pin, connections between one end of said lever and the weighing mechanism through which the lever is moved on the fulcrum-pin when the weighing mechanism is actuated, connections between the opposite end of the lever and the cost-indicator, and a price-per-pound indicator including a pointer affixed to the fulcrum-slide and a scale arranged to co-operate with said pointer in indicating the position of the fulcrum-pin required for the indication of any given price per pound, as set forth.

4. A computing-scale comprising in its construction a weighing mechanism having a vertically movable rack-bar, such as $b^2$; a cost-indicator having a rotary shaft $c$; an oscillatory lever having at one end a rack connected by a pinion with the rack-bar $b^2$ and at its other end a rack meshing with a pinion on the shaft $c$; an adjustable fulcrum movable in a slot in said lever; and a price-per-pound indicator comprising a pointer connected with said fulcrum and a fixed graduated scale co-operating with said pointer, as set forth.

In testimony whereof we have signed our names to this specification, in the presence of two subscribing witnesses, this 5th day of August, A. D. 1893.

CUMMINGS M. HOLDEN.
EUGENE M. GORDEN.

Witnesses:
W. C. MOORE,
W. T. HOLMES.